No. 762,777. PATENTED JUNE 14, 1904.
S. N. VERNON.
HOSE OR PIPE COUPLING.
APPLICATION FILED JAN. 19, 1904.
NO MODEL.
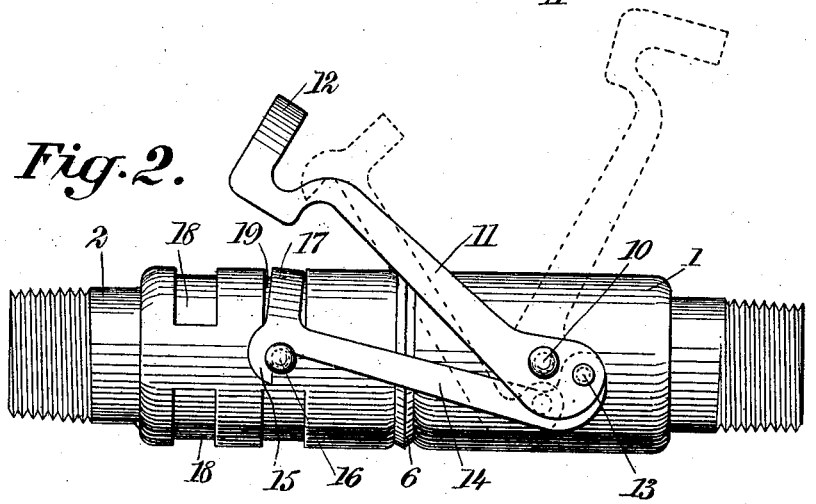
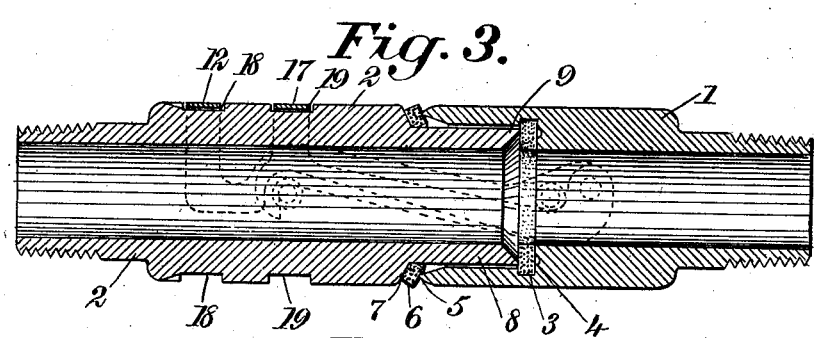
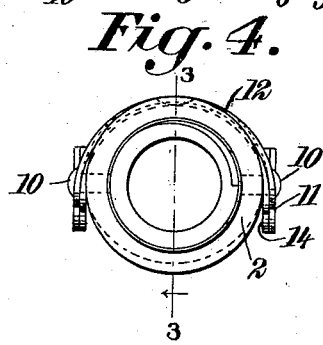
WITNESSES:
A. H. Davis
F. M. Hanaford
INVENTOR
Samuel N. Vernon
BY
ATTORNEYS No. 762,777. Patented June 14, 1904.

UNITED STATES PATENT OFFICE.

SAMUEL N. VERNON, OF SONORA, OHIO.

HOSE OR PIPE COUPLING.

SPECIFICATION forming part of Letters Patent No. 762,777, dated June 14, 1904.

Application filed January 19, 1904. Serial No. 189,729. (No model.)

*To all whom it may concern:*

Be it known that I, SAMUEL N. VERNON, a citizen of the United States, and a resident of Sonora, in the county of Muskingum and State of Ohio, have invented a new and Improved Hose or Pipe Coupler, of which the following is a full, clear, and exact description.

My invention relates to hose or pipe couplers, and is adapted for general use. It is more especially adapted for coupling fire-hose.

The objects of my invention are to secure quick coupling in a convenient manner, to secure an absolute locking device or clamp, and to secure a water-tight joint with accompanying simplicity and durability of construction, cheapness of manufacture, and other objects which will appear in the course of the following specification.

Reference is to be had to the accompanying drawings, forming a part of this specification, in which similar characters of reference indicate corresponding parts in all the figures.

Figure 1 is a side view of a pipe-coupling with one form of my invention applied thereto, the parts being shown in locked position. Fig. 2 is a similar view with the locking device shown in full lines partly unlocked and also shown in dotted lines in the position assumed when entirely unlocked. Fig. 3 is a longitudinal sectional view on the line 3 3 of Fig. 4, showing the interior construction of the coupling; and Fig. 4 is an end view of the device viewed from the left in Figs. 1, 2, and 3.

In the drawings which illustrate the spirit of my invention and show one form in which I contemplate applying it the numerals 1 and 2 represent the two coupling-sections, which are preferably formed of metal and adapted to be secured to the hose or pipe at their outer ends. The section 1 is cup-shaped in form at the inner end and contains a groove 3, adapted to hold a washer or other packing device 4. The cup-shaped end of this section is brought out to a sharp edge 5 by means of a conical interior, as shown, and this edge is designed to come in contact with and press upon a rubber washer or other packing device 6, supported on a shoulder 7 on the coupling-section 2. This section 2 is provided with a tubular neck 8, extending into the cup-shaped portion of the section 1 when the parts are brought together. This neck is provided with a sharpened edge 9 by means of the conical interior, as shown, which edge is designed to come into contact and press the washer or packing 4 when the parts are locked together.

Upon opposite sides of the section 1 are studs 10, to which are pivoted two parallel legs 11, forming a lever. These parts 11 are secured together at their outer ends by means of a finger-piece 12, formed in a circular shape to correspond with the shape of the coupling-section 2. Upon the other end of each part 11 is a stud 13, and loosely pivoted thereon at one end on each side of the coupling-section 1 is a locking-link 14. These two links 14 are connected together by yokes 17, formed in such a shape as to readily fit over the coupling-section 2. Upon these links at their outer ends are hooks 15, one at each side of the coupling-sections and adapted to fit over studs 16, secured to opposite sides of the section 2. In the section 2 are formed grooves 18 and 19, respectively, adapted to receive the finger-piece 12 and the yoke 17 when the parts are in closed or locked position, (shown in Fig. 1,) and it will be observed that these grooves are formed on both sides of the section 2, so that it will make no difference upon which side the locking device is placed.

It will be seen from this description that when the parts are in the position shown in dotted lines at the right of Fig. 2 pressure applied to the finger-piece 12 to force it about its pivots toward the coupling-section 2 will cause the locking-hooks 15 to descend upon and engage with the studs 16 and that from the peculiar position of the pivots 10 and 13 the parts will be securely locked together when they are brought to the position shown in Fig. 1. The construction of the interior of the coupling-sections, as shown in Fig. 3, will aid in the security thus effected and effectually produce a water-tight joint when the parts are thus locked together. It will also be seen that as the hooks and levers are on the same side of the coupling-sections the device can be very quickly locked or coupled, and, in fact, this can be done by a blow of the hand when the parts are once put in proper position. It will also be seen that the coupling will be a powerful one not easily ruptured, that the joints will be perfectly water-tight at two points, and that as the finger-piece and yoke are adapted to rest in the grooves in the coupling-section 2 there will be no projecting parts to interfere with the proper operation of the hose or pipe.

Having thus described my invention, I claim as new and desire to secure by Letters Patent—

1. The combination with two coupling-sections, of a lever having a finger-piece conforming to the shape of one of said sections and parallel legs pivoted to one of the sections on opposite sides thereof, a locking-link having parallel legs each pivoted to a leg of said lever, a hook on the end of each of the legs of said link, studs on opposite sides of the other section adapted to be engaged by said hooks, and a groove in the last-mentioned section adapted to receive said finger-piece.

2. The combination with two coupling-sections, of a lever having a finger-piece conforming to the shape of one of said sections and parallel legs pivoted to one of the sections on opposite sides thereof, a locking-link having parallel legs each pivoted to a leg of said lever, a hook on the end of each of the legs of said link, studs on opposite sides of the other section adapted to be engaged by said hooks, and grooves on opposite sides of said last-mentioned section to receive said finger-piece when in closed position and hold it flush with the surface of the section.

3. The combination with two coupling-sections, of a lever having a finger-piece conforming to the shape of one of said sections and parallel legs pivoted to one of the sections on opposite sides thereof, a locking-link having parallel legs each pivoted to a leg of said lever, a hook on the end of each of the legs of said link, studs on opposite sides of the other section adapted to be engaged by said hooks, a yoke conforming to the shape of one of said sections and connecting the legs of the link together, and a groove in said last-mentioned section adapted to receive said yoke and hold it flush with the surface of the section.

4. The combination with two coupling-sections, of a lever having a finger-piece conforming to the shape of one of said sections and parallel legs pivoted to one of the sections on opposite sides thereof, a locking-link having parallel legs each pivoted to a leg of said lever, a hook on the end of each of the legs of said link, studs on opposite sides of the other section adapted to be engaged by said hooks, a yoke conforming to the shape of one of said sections, and connecting the legs of the link together, and grooves in said last-mentioned section to receive said finger-piece and said yoke.

In testimony whereof I have signed my name to this specification in the presence of two subscribing witnesses.

SAMUEL N. VERNON.

Witnesses:
A. J. RILEY,
H. E. BUKER.